United States Patent Office 3,584,034
Patented June 8, 1971

3,584,034
PREPARATION OF VINYL ACETATE
FROM ETHYLENE
Harry B. Copelin, Niagara Falls, N.Y., assignor to E. I.
du Pont de Nemours and Company, Wilmington, Del.
No Drawing. Filed June 23, 1965, Ser. No. 466,448
Int. Cl. C07c 67/04
U.S. Cl. 260—497
9 Claims

ABSTRACT OF THE DISCLOSURE

An improved cyclic two stage method for preparing vinyl acetate from ethylene and acetic acid in the presence of a palladium II salt and a cupric salt wherein the improvement comprises effecting the first stage reaction in the presence of 0.05 to 2.6 molar potassium chloride, a metal acetate providing acetate ions at a concentration of at least 0.01 molar and water at 0 to 3% by weight.

---

This invention relates to a method of producing vinyl acetate, particularly vinyl acetate in high yield with minimum formation of acetaldehyde as a by-product.

It is known (Moiseev et al., Doklady Akad. Nauk SSSR. 133, 337 (1960)) that vinyl acetate can be produced by reacting ethylene with anhydrous acetic acid containing palladium chloride and sodium acetate. The acetic acid reaction medium preferably also contains an oxidizing agent, such as a quinone or a cupric salt whose purpose is to prevent reduction of the palladium salt to metallic palladium. A similar preparation of vinyl acetate is described in British Pat. 928,739.

The oxidizing agent, which becomes reduced during use, may be reoxidized in situ for continued use by means of oxygen supplied with the ethylene to the reaction medium (hereinafter called the "working solution"); or the reduced working solution may be regenerated for reuse by oxidation in a separate operation, as disclosed in Belgian Pats. 608,610 and 614,970, and in French Pat. 1,318,208.

The presence of water in the working solution during the reaction to produce vinyl acetate is known to cause formation of acetaldehyde as a by-product along with the vinyl acetate. Acetaldehyde has generally been regarded as an undesired by-product and the above references emphasize employing an anhydrous reaction medium or one from which water has been eliminated as much as possible, thereby to minimize acetaldehyde formation.

The reaction of ethylene and the ionizable metal acetate to produce vinyl acetate is catalyzed by the palladium II salt, probably through the intermediate formation of an ethylene-palladium II salt complex, e.g.

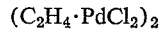

When the ionizable acetate is cupric acetate, which would also function as the oxidizing agent, the reaction may be represented as follows:

(A) $C_2H_4 + 2Cu(OOCCH_3)_2 \rightarrow$
$CH_2=CHOOCCH_3 + 2CuOOCCH_3 + HOOCCH_3$ The regeneration reaction by which the cuprous acetate product of reaction A is reoxidized to cupric acetate for reuse is as follows:
reuse is as follows:

(B) $2CuOOCCH_3 + 2HOOCCH_3 + \frac{1}{2}O_2 \rightarrow$
$2Cu(OOCCH_3)_2 + H_2O$ The net or over-all reaction is:

(C) $C_2H_4 + HOOCCH_3 + \frac{1}{2}O_2 \rightarrow$
$CH_2=CHOOCCH_3 + H_2O$ from which it will be seen that one mole of acetic acid is consumed and one mole of water is formed for each mole of vinyl acetate produced in the cycle.

As a by-product in the first reaction stage, acetaldehyde is often produced in substantial amounts. In certain instances, this may be desirable when, for example, a market for this material exists or when it could be used captively as for the production of acetic acid. In other instances, however, where for example inexpensive acetic acid is available from other sources, the formation of acetaldehyde in the vinyl acetate process becomes simply a yield loss. Under these circumstances, its formation is undesirable and there would be a considerable cost advantage in minimizing its formation.

The improved process of the present invention relates generally to the production of vinyl acetate from ethylene using an acetic acid working solution of a palladium II salt and a cupric salt oxidizing agent. According thereto vinyl acetate is produced in high yield, with a minimum formation of acetaldehyde as a by-product, by a combination of certain processing conditions and a suitable selection of the components of the working solution. In part the improved process involves effecting the reaction under conditions whereby the ethylene pressure is at least 100 p.s.i.g. and the water content, based on the weight of the working solution does not exceed 3%. Most importantly, however, there is also provided in the working solution potassium chloride at a concentration of 0.05 to 2.6 molar and an ionizable acetate salt providing acetate ions at a concentration at least 0.01 molar, respectively. The acetate ions may be provided as a salt with potassium or as a salt with copper, i.e., as cupric acetate, in which case it would also function as the oxidizing agent. Preferably, a combination of potassium acetate and cupric acetate is employed.

As will be particularly evident from the specific examples hereinafter, the use of potassium chloride in the working solution enables the attainment of substantially higher ratios of vinyl acetate to acetaldehyde than would experienced with numerous other metal halides, including even other alkali metal chlorides, used under the same conditions. That the presence of the potassium chloride, when used under the particular process conditions described above, uniquely achieves this effect is unexpected and the finding thereof offers distinct advantages in those instances where the formation of byproduct acetaldehyde is to be avoided.

The impoved method of the invention may be performed on a continuous scale in a single-stage process, wherein synthesis and oxidation reactions are carried out simultaneously, or in a two-stage process. In the single stage process water is formed continuously in the oxidation reaction and various techniques may be used to maintain it at below 3%, e.g., by partial replacement of acetic acid in the working solution with acetic anhydride or by blowing large amounts of gas through the working solution.

The two-stage process does not liberate water in the synthesis step and hence the amount of water therein will depend on the amount in the feed. The water content of the feed can be maintained at a suitably low level of 0 to 3% by weight, based on the working solution, by common drying procedures. Ordinarily it will be economically unattractive to remove the final traces of water from the feed and for this reason a practical minimum water content would usually be 0.2 to 3% by weight, based on the working solution.

A preferred technique for producing vinyl acetate from ethylene by a two-stage process is that described in Copelin et al. U.S. application Ser. No. 345,064, filed Feb. 17, 1964. For adaptation thereof to the present invention water in the reoxidized working solution from the second stage can be removed by conventional stripping methods or by the use of dehydrating agents before recycling to the first-stage or synthesis reactor. Alternatively water can be removed between the first and second stages, e.g., by treatment of the partially reduced working solution from which vinyl acetate has been removed.

Apart from the drying modifications mentioned above, conventional single or two-stage apparatus may be used for carrying out the process of the invention. The synthesis reaction is performed at a temperature of at least 50° C., e.g., 50 to 160° C., and at an ethylene pressure of at least 100 p.s.i.g., e.g., 100 to 2000 p.s.i.g. Lower pressures tend to increase the amount of acetaldehyde while with lower temperatures the space time yields are too low. Higher temperatures and pressures result in no added advantages. The preferred temperatures range from 80 to 130° C. while the preferred ethylene pressures range from 200 to 500 p.s.i.g.

The oxidation of reduced copper in a two-stage process can be carried out employing oxygen gas in a purified form or, more simply, just air. In a single-stage process a purified form of oxygen is preferred as otherwise the gaseous phase will be diluted with nitrogen and recycling of the ethylene gas will become unduly complex. Oxygen partial pressures of from 0.01 to 2 atmospheres or more are generally suitable and, when using air, operation with the system under pressure so as to give oxygen partial pressures within the above range is desirable. Whether using oxygen gas, oxygen-enriched air, or air, the preferred oxygen partial pressures range from 0.1 to 1 atmosphere. During the oxidation reaction, agitation is desirable to keep the solids in suspension and to provide good contact between the gaseous reactant and the working solution. Reaction temperatures of at least 50° C., e.g., 50° to 150° C., and preferably 80° to 130° C., are employed.

The working solution in its oxidized state is an acetic acid solution of a palladium II salt, a cupric salt oxidizing agent, potassium chloride and an ionizable metal acetate salt. Cupric acetate can be used to serve both as the oxidizing agent and as the source of acetate ions. It is advantageous, however, to have some potassium acetate additionally present.

Suitable palladium II salts for use in the working solution are the chloride ($PdCl_2$), the bromide ($PdBr_2$) and the acetate ($Pd(OAc)_2$); and the alkali metal chloro- and bromopalladites, such as potassium chloropalladite $$(K_2PdCl_4)$$

and lithium chloropalladite ($Li_2PdCl_4$). Use of the palladous halide, $PdCl_2$ or $PdBr_2$, in the form of an alkali metal halopalladite, e.g., $Li_2PdCl_4$, is generally preferred. The palladium II salt, the important part of which is the Pd II portion thereof, should be soluble in the working solution in an amount to provide a dissolved palladium II salt concentration of from 0.001 to 0.1 mole, or higher, preferably 0.003 to 0.03 mole, per liter. The palladium II salt can be charged to the working solution as one of the salts indicated above; or palladium metal, its oxide or carbonate may be charged and dissolved in the working solution.

The ionizable metal acetate is either potassium acetate, cupric acetate, or a combination of the two. Such acetates can be charged as such or they can be formed by reaction of the oxides, hydroxides or carbonates of the indicated metals with the acetic acid component of the working solution. The metal acetate content of the working solution should be at least 0.01 molar, e.g., 0.01 to 1 molar; preferably it will be at least 0.1 molar, e.g., 0.1 to 0.5 molar. Cupric acetate can be used in concentrations exceeding the solubility thereof, as described below, such that the working solution may be in the form of a slurry. Metal acetate concentrations exceeding about 1 molar afford no particular added advantage, except when using cupric acetate, in which case, concentrations as high as 2.5 molar are advantageous for reasons explained below.

Cupric acetate is advantageous in that it can serve both as a source of acetate ions and as the oxidizing agent and its use at a concentration of 0.05 to 2.5, particularly 1.0 to 1.5, moles per liter is preferred. At the higher of such concentrations, part of the cupric acetate will not dissolve and the initial mixture will be a slurry. However, as the reaction proceeds, the cupric acetate in solution is reduced to the cuprous salt and more of the cupric acetate dissolves. In the presence of the chloride ion, the reduced cuprous ion will precipitate as cuprous chloride and, therefore, the working solution will generally be a slurry whose solid phase will be either cupric acetate, cuprous chloride, or both.

The oxidizing agent of the working solution is a cupric salt such as the chloride, bromide or the acetate, the latter being preferred as indicated above. It will be charged to the working solution to provide a concentration therein of from 0.05 to 2.5, preferably 1 to 1.5, moles per liter. A high cupric salt content is desirable to provide a working solution of high synthesis capacity. As explained previously, the amount of cupric salt charged may exceed its solubility, but should not be so great as to result in a slurry which cannot be effectively agitated and transported, e.g., by pumping. While cupric chloride or bromide can be used, the amount thereof, if used, should be restricted in keeping with the chloride ion requirements explained below.

The concentration of potassium chloride in the working solution can vary quite widely but usually will be in the range of 0.05 to 2.6 molar. At lower concentrations productivity will be unduly low. Moreover, since potassium chloride has only a limited solubility in the acetic acid working solution, greater concentrations will only result in high viscosity slurries that are difficult to handle. The preferred potassium halide concentration is 0.2 to 2.0 momolar. Within the range of 0.05 to 2.6 molar and using the process conditions above described, potassium chloride will enable the attainment of unusually high conversions to vinyl acetate.

The invention is illustrated by the following examples. In the examples and throughout the specification, all composition percentages are by weight.

EXAMPLES 1–7

A titanium autoclave was charged with 100 g. of glacial acetic acid, 30 g. of cupric acetate monohydrate and 0.25 g. of lithium chloropalladite. Metal chloride and metal acetate salts as indicated below were then added, the bomb sealed, heated to 95–100° C., and ethylene admitted to a pressure of 300 p.s.i.g. This temperature was maintained until no further reaction occurred. When the pressure fell to 200 p.s.i.g., the bomb was repressurized with ethylene to 300 p.s.i.g. The bomb was then cooled, vented, and opened. The contents were analyzed by vapor chromatography. In all cases the water content of the mixtures is in the range of 2.3 to 3%. Results obtained were as follows:

| | | | | | Mole conversion based upon cupric salt reduced | |
|---|---|---|---|---|---|---|
| No. | Metal chloride | G. | Metal acetate | G. | To acetaldehyde | To vinylacetate |
| 1 | LiCl | 2 | LiOAc·2H$_2$O | 1 | 9.5 | 83.6 |
| 2 | MgCl$_2$ | 2 | Mg(OAc)$_2$·4H$_2$O | 1 | 5.0 | 59.0 |
| 3 | ZnCl$_2$ | 7 | Zn(OAc)$_2$·2H$_2$O | 2 | 18.2 | 73.0 |
| 4 | NiCl$_2$ | 3 | Ni(OAc)$_2$·4H$_2$O | 1.2 | 5.2 | 56.0 |
| 5 | FeCl$_3$ | 3 | Fe(OAc)$_2$·OH | 2.0 | 8.0 | 59.0 |
| 6 | CaCl$_2$ | 2 | Ca(OAc)$_2$·H$_2$O | 1 | 8.1 | 67.0 |
| 7 | KCl | 2 | KOAc | 1 | 2.5 | 97.0 |

As is apparent from the foregoing, the use of the potassium chloride in Example 7 results in a substantial gain in selectivity of vinyl acetate over acetaldehyde.

EXAMPLES 8–10

A titanium autoclave was charged with 100 g. of glacial acetic acid, 27 grams of anhydrous copper acetate, 10 grams of potassium acetate, 2 g. of potassium chloride, and 0.5 g. of potassium chloropalladite ($K_2PdCl_4$). It was then sealed, heated to 95–100° C. and pressurized with ethylene at 200 p.s.i.g. This temperature and pressure were maintained during the run. When no more ethylene absorption occurred, the bomb was cooled and vented and the contents analyzed by vapor chromatography. This test was repeated using a 50–50 molar mixture of anhydrous copper acetate and the monohydrate. It was also repeated using 30 g. of copper acetate monohydrate.

| No. | Copper acetate charged | Percent water on total charge | Mole conversion based upon cupric salt reduced | |
|---|---|---|---|---|
| | | | To acetaldehyde | To vinyl acetate |
| 8 | All anhydrous | <.2 | 0.4 | 97 |
| 9 | 50–50 | 1.0 | 3.7 | 90 |
| 10 | All hydrate | 2.0 | 5.4 | 92 |

EXAMPLE 11

The autoclave was charged with 100 g. glacial acetic acid, 12 g. of potassium chloride, 30 grams of cupric acetate monohydrate and 0.25 g. of lithium chloropalladite. During the run the temperature was maintained at 95–100° C. and the ethylene pressure at 200 p.s.i.g. After cooling and venting, analysis of the product showed conversion of cupric salt to acetaldehyde of 3% and to vinyl acetate of 95%.

EXAMPLES 12–15

A series of tests were made at 100° C. and various ethylene pressures. The charge used was glacial acetic acid 100 g., copper acetate monohydrate 15 g., anhydrous copper acetate 13.5 g., potassium acetate 3 g., potassium chloride 2 g., and potassium chloropalladite 0.5 g. The results were as follows:

| No. | Ethylene pressure, p.s.i.g. | Mole conversion based upon cupric salt reduced | |
|---|---|---|---|
| | | To acetaldehyde | To vinylacetate |
| 12 | 300 | 1.9 | 97 |
| 13 | 200 | 3.2 | 95 |
| 14 | 100 | 5.5 | 93 |
| 15 | 50 | 8.0 | 90 |

EXAMPLE 16

To simulate operation of a cyclic process, the reduced working solution from the synthesis reaction of Example 13 is stripped of vinyl acetate and acetaldehyde and then subjected to an oxidation reaction.

The stripping of vinyl acetate and acetaldehyde is effected by removal of those fractions as overhead products from a conventional still. The stripped reduced working solution then is regenerated by a batch oxidation in a second pressure vessel. The oxidation is performed over a period of about 10 minutes at a temperature of about 95 to 100° C. while charging oxygen at a rate to provide an oxygen partial pressure therein of about 1 atmosphere. The reoxidized working solution is then passed through a column of dehydrating agent to lower the water content to below 3% and then recycled to the synthesis autoclave. Fresh glacial acetic acid is added to provide a charge having the composition indicated in Example 13 and then ethylene is introduced and the synthesis once again performed.

What is claimed is:

1. In a method for producing vinyl acetate by the reaction of ethylene with an acetic acid working solution of a palladium II salt and a cupric salt oxidizing agent; the improvement, for producing vinyl acetate in high yield with minimum formation of acetaldehyde, comprising effecting the reaction at an ethylene pressure of at least 100 p.s.i.g. with said working solution which, in its oxidized state, is provided to contain the following in the amounts indicated:
 (a) water, 0 to 3% by weight,
 (b) potassium chloride at a concentration of 0.05 to 2.6 molar, and
 (c) a metal acetate providing acetate ions at a concentration of at least 0.01 molar.

2. Method according to claim 1 wherein the ethylene pressure is at least 200 p.s.i.g.

3. Method according to claim 1 wherein the reaction is effected at a temperature of 50 to 150° C.

4. Method according to claim 1 wherein the reaction is effected at a temperature of 80 to 120° C.

5. Method for producing vinyl acetate in high yield with minimum formation of acetaldehyde comprising effecting reaction of ethylene at an ethylene pressure of at least 100 p.s.i.g. and at a temperature of 50 to 160° C. with a working solution comprising, in its oxidized state, acetic acid containing 0 to 3% by weight of water, based on the solution components, a 0.05 to 2.6 molar concentration of potassium chloride, a 0.01 to 1 molar concentration of potassium acetate, a 0.001 to 0.1 molar concentration of a palladium II salt, and a 0.05 to 2.5 molar concentration of a cupric salt oxidizing agent, and recovering the vinyl acetate so formed.

6. Method according to claim 5 wherein the said potassium chloride concentration is 0.2 to 2.0 molar.

7. In a cyclic method for producing vinyl acetate by the reaction in a first stage of ethylene with an acetic acid working solution of a palladium II salt and a cupric salt oxidizing agent, separation of vinyl acetate from the at least partially reduced working solution so obtained, and reoxidation in a second stage of the at least partially reduced working solution by the reaction thereof with gaseous oxygen followed by the recycling thereof to the said first stage, the improvement, for producing vinyl acetate in high yield with minimum formation of acetaldehyde, comprising effecting the first stage reaction at an ethylene pressure of at least 100 p.s.i.g. with said working solution which, in its oxidized state, is provided to contain the following in the amounts indicated:
 (a) water, 0 to 3% by weight,
 (b) potassium chloride at a concentration of 0.05 to 2.6 molar, and
 (c) a metal acetate providing acetate ions at a concentration of at least 0.01 molar.

8. Cyclic method according to claim 7 wherein the working solution recycled to the first stage has been dehydrated to a water content of 0 to 3% by weight.

9. Cyclic method according to claim 7 wherein the reoxidation of the at least partially reduced working solution has been effected with oxygen at a temperature of 50 to 150° C. and an oxygen partial pressure of 0.01 to 2 atmospheres.

References Cited

UNITED STATES PATENTS 3,221,045  11/1965  McKeon et al. _____ 260—497
3,260,739  7/1966  Schaeffer _____ 260—497

FOREIGN PATENTS 608,610  3/1962  Belgium _____ 260—497
615,596  9/1962  Belgium _____ 260—497

JAMES A. PATTEN, Primary Examiner

V. GARNER, Assistant Examiner

U.S. Cl. X.R.

252—416; 260—604